United States Patent
Flint (10) Patent No.: US 11,990,938 B2
(45) Date of Patent: May 21, 2024

(54) SYSTEM AND METHOD FOR INCREASING OPTICAL POWER IN AN RF OVER FIBRE LINK

(71) Applicant: Leonardo UK Ltd, London (GB)

(72) Inventor: Ian Flint, Basildon (GB)

(73) Assignee: LEONARDO UK LTD, London (GB)

( * ) Notice: Subject to any disclaimer, the term of this patent is extended or adjusted under 35 U.S.C. 154(b) by 173 days.

(21) Appl. No.: 17/634,736

(22) PCT Filed: Aug. 13, 2020

(86) PCT No.: PCT/EP2020/072822
§ 371 (c)(1),
(2) Date: Feb. 11, 2022

(87) PCT Pub. No.: WO2021/028556
PCT Pub. Date: Feb. 18, 2021

(65) Prior Publication Data
US 2022/0278749 A1 Sep. 1, 2022

(30) Foreign Application Priority Data

Aug. 13, 2019 (GB) ..................................... 1911590

(51) Int. Cl.
*H04B 10/2575* (2013.01)
*H04B 10/80* (2013.01)

(52) U.S. Cl.
CPC ....... *H04B 10/2575* (2013.01); *H04B 10/807* (2013.01)

(58) Field of Classification Search
None
See application file for complete search history.

(56) References Cited

U.S. PATENT DOCUMENTS

| 5,724,459 A | 3/1998 | Banba et al. |
| 6,246,500 B1 | 6/2001 | Ackerman |

(Continued)

FOREIGN PATENT DOCUMENTS

| JP | H06-268590 A | 9/1994 |
| JP | H08-163029 A | 6/1996 |

(Continued)

OTHER PUBLICATIONS

Office Action (Notice of Reasons for Refusal) dated Apr. 4, 2023, by the Japan Patent Office in corresponding Japanese Patent Application No. 2022-509151 and an English translation of the Office Action. (13 pages).

(Continued)

*Primary Examiner* — David W Lambert
(74) *Attorney, Agent, or Firm* — BUCHANAN INGERSOLL & ROONEY PC (57) ABSTRACT

Improving the signal to noise ratio in an optical link involves either reducing the noise or increasing the RF power coupled into the optical link by lowing the voltage, Vπ, required to induce a phase change of π of the optical beam passing through the optical modulator. The present disclosure relates to methods and architectures for increasing the optical power through a link through providing one or more laser sources, additional modulators or photodiode receivers and dividing the optical power through these components so that none are overloaded.

17 Claims, 6 Drawing Sheets

(56) References Cited

U.S. PATENT DOCUMENTS

| | | | |
|---|---|---|---|
| 7,245,833 B1 | 7/2007 | Volkening | |
| 8,059,969 B1 * | 11/2011 | Yap | H04B 10/25759 398/140 |
| 10,250,330 B1 | 4/2019 | Cabello et al. | |
| 2003/0090777 A1 | 5/2003 | Yap | |
| 2007/0166054 A1 | 7/2007 | Yu et al. | |
| 2010/0028012 A1 | 2/2010 | Ng | |
| 2017/0257165 A1 | 9/2017 | Pescod et al. | |
| 2018/0331764 A1 | 11/2018 | Flint | |

FOREIGN PATENT DOCUMENTS

| | | |
|---|---|---|
| JP | H08-274712 A | 10/1996 |
| JP | H09-023192 A | 1/1997 |
| JP | 2000252922 A | 9/2000 |
| JP | 2010-021868 A | 1/2010 |
| JP | 2013-090217 A | 5/2013 |
| JP | 2013146039 A | 7/2013 |
| JP | 2017-528997 A | 9/2017 |
| JP | 2018-074477 A | 5/2018 |
| WO | 2006102678 A1 | 9/2006 |
| WO | 2016102678 A1 | 6/2016 |

OTHER PUBLICATIONS

Examination Report under Section 18(3) issued in corresponding Patent Application No. GB2012678.5 dated Nov. 23, 2021.

International Search Report (PCT/ISA/210) and Written Opinion (PCT/ISA/237) dated Jan. 18, 2021, by the European Patent Office as the International Searching Authority for International Application No. PCT/EP2020/072822.

First Office Action dated Oct. 31, 2023, by the Japanese Patent Office in corresponding Japanese Patent Application No. 2022-509151, and an English Translation of the Office Action. (5 pages).

* cited by examiner

SYSTEM AND METHOD FOR INCREASING OPTICAL POWER IN AN RF OVER FIBRE LINK

There is interest in replacing co-axial cable links with optical fibre links to carry RF signals within RF systems; e.g. between an antenna and signal processing system, which can very often be separated by many metres. Compared with co-axial cable, an optical link provides the possibility of reduced power loss and performance that is independent of RF frequency. Further, optical fibres are comparatively light and small compared with co-axial cable and less prone to electromagnetic interference.

Known optical links for carrying RF signals comprise a laser to provide an optical beam. The RF signal is imposed on the beam by an electro-optical modulator, an example being a Mach Zehnder modulator that imposes the RF signal by modulating the amplitude of the optical beam. The modulated optical beam is transmitted along a fibre of the link to an optical input of a photo detector which outputs the RF signal through an analogue electrical output.

Improving the signal to noise ratio in an optical link involves either reducing the noise or increasing the RF power coupled into the optical link by lowing the voltage, $V\pi$, required to induce a phase change of $\pi$ of the optical beam passing through the optical modulator. The latter approach has been the conventional route taken today.

In high quality optical analogue links, the primary contributor of noise is relative intensity noise (RIN), which is the variation in amplitude (flickering) of the laser light. Most if not all RIN noise is derived from the laser. RIN can be ameliorated using a balanced photo detector receiver. With RIN ameliorated, the next limiting factor is Shot noise. The level of Shot noise is dependent on the optical power of the system; in principle a higher optical power leads to a lower Shot noise.

Many of the more widely available and inexpensive optical components, e.g. lasers, particularly those designed to operate in the C and L bands, i.e. between 1530 nm to 1610 nm have relatively low (10 mW-100 mW) maximum operating powers.

The present invention was devised to allow for increased optical power in an RF over fibre link to reduce Shot noise.

According to the invention there is provided a system including an optical link system for carrying a microwave radio frequency (RF) signal; the optical link system comprising:

a plurality of laser light sources for producing a plurality of wavelengths of light;

a multiplexer to multiplex the plurality of wavelengths of light to provide a multiplexed optical beam;

a modulator to modulate the multiplexed optical beam to impose the microwave radio frequency signal onto the multiplexed optical beam;

a photodiode receiver having an optical input and an electrical output, the photodiode receiver arranged to receive at least a portion of the modulated multiplexed optical beam and to output the microwave radio frequency signal at its electrical output.

According to another aspect of the invention there is provided A method of designing and constructing a system comprising an optical link for carrying a microwave radio frequency (RF) signal to increase signal to noise ratio in which shot noise is the dominant source of noise; the method comprising:

identifying a requisite optical power to be transmitted through the optical link to provide, by virtue of the signal to shot noise ratio, link an acceptable noise floor level at an output of the system determining a number of lasers the optical link requires based on their optical output power to provide the identified optical power for the optical link;

determining a number of modulators the optical link requires to modulate the RF signal onto one or more output beams(s) of the lasers, based on each modulator's maximum optical input level;

determining a number of photodiode receivers the optical link requires to receive and convert one or more optical beam(s) modulated to carry the RF signal to an electrical signal, the number of photodiode receivers determined based on each photodiode receiver's maximum optical input level before degradation in output quality;

and constructing the optical link with the determined number of lasers, modulators and photodiode receivers, wherein the number of modulators and/or photodiode receivers is greater than one.

The following can apply to either aspect of the invention.

Multiplexing multiple lasers increases the optical power of the link whilst still allowing the beams to be derived from relatively low power lasers which are widely available and can be obtained relatively cheaply. Further, lower power lasers tend to have lower signal to noise ratio than higher power lasers or optical amplifiers. For example, by multiplexing ten lasers each of 100 mW it is possible to provide an optical signal of ~1 W. In theory this gives a reduction in Shot noise of around 10 dB in signal-noise ratio over a 100 mW signal.

It is favourable that the wavelength of each laser is separated from the others by an amount that ensures the beating arising from multiplexing the optical beams occurs at frequencies which are greater than can be resolved by the photodiode or the analogue to digital converter to which the output of the photodiode may be connected.

The separation of the wavelengths is favourably 10× (frequency resolution of ADC or photodiode/light frequency) x the wavelength in nm of the light. Thus for C band telecommunication using photodiodes or ADCs that can resolve adequately to 2 GHz with equates to 10×(2E9/2e14)*1550 nm=0.1 nm This can be achieved by selecting each laser to output a beam of a wavelength that is separated from the other lasers by at least 0.1 nm. Likewise for 20 GHz resolution, typical, of a high speed photodiode, the wavelengths needs to 1 nm apart.

The different frequencies of the lasers are not detectable by the photodiode(s) of the photodiode receiver, which only sees a beam with an optical flux corresponding to the combined optical power of the lasers.

Favourably each laser outputs a beam with a wavelength between 1530 nm to 1610 nm. Selecting lasers with wavelengths between 1530 nm to 1610 nm has a number of advantages. Firstly many commercially available electro-optic modulators have a performance that does not change significantly over this band. Additionally, the optical components that operate in this band (corresponding to C and L bands) are well developed, relatively cheap and generally compatible with one another. Additionally optical components that operate in this band can be readily provided on a integrated photonic chip.

The multiplexer may multiplexed the beams using wavelength divisional multiplexing.

The polarisation of each of the multiplexed beams is favourably substantially the same. This ensures that that the electro-optic modulator modulates each beam in a similar way.

The electro-optic modulator may comprise a Mach Zehnder modulator. The optical link may comprise a plurality of modulators. The multiplexed signal may be divided between the plurality of modulators where the optical power of the multiplex signal is too great for any one modulator to handle. Where so each modulator may be adapted to impose the RF signal onto a different one of the divided multiplexed signals or a portion of the RF signal or onto a different one of the divided multiplexed signals.

For example the electro-optic modulator may comprise a dual parallel Max Zehnder electro optic modulator. This allows for the imposition of two RF signals onto the multiplexed optical signal, e.g. for the purposes of up converting or down converting the microwave radio frequency signal.

Where the photodiode receiver comprises a balanced photodiode receiver it is preferable that the RF path lengths of the two channels to the two inputs of the balanced photodiode receiver is substantially the same to ensure common mode rejection. A common RF path length between the modulator and photodiode also avoids dispersion of different RF wavelengths within the RF signal.

The system may comprise multiple photodiode receivers each adapted to receive a optical beam e.g. a sub-divisional of the multiplexed beam on which the RF signal has been moduluated.

Where it is desired to impose multiple RF signals onto the first multiplexed optical channel, e.g. the microwave RF signal and a LO signal for the purposes of up or down converting the microwave RF signal, the modulator may comprise a multiple (e.g. dual) parallel Mach Zehnder modulator. This arrangement reduces the optical power at each photodiode receiver thereby allowing the use of photodiode receivers with lower maximum optical power ratings.

Where the system comprises multiple photodiode receivers, the system may comprise a RF combiner arranged to combine the electrical outputs from the multiple photodiode receivers. The RF combiner may be implemented using, for example a Wilkinson combiner, Lange combiner, or any other suitable combiner.

Alternatively the system may comprise multiple RF mixers and multiple local oscillators, each of the multiple local oscillators arranged to provide a LO signal of a different RF frequency; each RF mixer arranged to receive and mix the electrical output from a different one of the multiple photodiode receivers and the LO signal from a different one of the multiple local oscillators so as to down convert or up convert the RF microwave signal. This provides a means of up or down conversion in the electrical domain.

The post modulation splitter may be wavelength independent, e.g. implemented by a partially reflective mirror, a fused fibre coupler or a demultiplexer.

The system may comprise a wavelength independent splitter arranged to split the multiplexed optical signal into first and second multiplexed optical channels; the modulator is arranged to modulate the first multiplexed optical channel to impose the microwave radio frequency signal onto the first multiplexed optical channel; and the photodiode receiver comprises a balanced photodiode receiver having: a first optical input arranged to receive the modulated first multiplexer optical channel; and a second optical input arranged to receive the second multiplexed optical channel; the balanced photodiode receiver being arranged to carry out a common mode rejection function on the inputs to remove relative intensity noise RIN.

The post modulation optical splitter may be arranged to split the modulated multiplexed optical beam into multiple beams; the optical link system comprises a further optical splitter arranged to split the second multiplexed optical channel into multiple beams; and the multiple balanced photodiodes receivers are each arranged to receive at their first input one of the split first modulated multiplex optical channels, and at their second input one of the split second multiple optical channels.

The further optical splitter may be wavelength independent or a demultiplexer, however it will usually be the same as the optical splitter.

The modulator is also arranged to impose a first LO RF signal from a local oscillator onto the multiplexed optical beam for the purpose of upconverting or downconverting the microwave RF signal.

The system may comprise means including the multiplexer to provide a further multiplexed optical beam from the plurality of wavelengths of light; a further modulator to modulate the multiplexed optical beam to impose the microwave radio frequency signal onto the further multiplexed optical beam; and wherein the further modulator is arranged to also impose a second LO RF signal onto the further multiplexed optical beam; the first and second LO RF signals being of different frequencies; and in which the system comprises a further photodiode receiver arranged to receive the modulated further multiplexed optical beam.

In one application, the system may be arranged to carry RF signals between an antenna mounted on an airborne or marine platform to a processing system also mounted on said airborne or marine platform or vice versa.

According to another aspect of the invention there is provided method for conveying a microwave radio frequency (RF) signal via an optical link; the method comprising: multiplexing a plurality of wavelengths of light from a plurality of lasers to provide a multiplexed optical beam; modulating the multiplexed optical beam to impose the microwave radio frequency signal onto the multiplexed optical beam; and using a photodiode receiver, having an optical input and an electrical output, to receive at least a portion of the modulated multiplexed optical beam and to output the microwave radio frequency signal at its electrical output.

The invention will now be described by way of example with reference to the following Figures in which.

Generally an optical link for carrying an RF signal comprises a laser that outputs an optical beam, an electro-optic modulator that modulates the optical beam to carry the RF signal and a photo receiver that receives the modulated optical beam and outputs an electrical signal representative of the RF signal. In a system where RIN noise has been reduced—e.g. by using a balanced photodiode receiver—

Shot noise is the dominant noise that contributes the to signal-noise ratio at the output of the optical link.

Below are described example systems to increase the signal-noise ratio by increasing the optical power through the optical link. An increase in optical power—number of photons travelling through the link—increases the signal-noise ratio because although it increases both the signal level and shot noise the signal level is creased by a greater degree.

Increasing the optical power can be done through increasing the power of the laser used or usually more favourably—as described in the below examples—by combining the outputs from multiple lasers together to form a multiplexed beam. Practically the problem is that most commercially available modulators and photodiodes are not designed to operate (either catastrophically fail or provide a sub optimum output) at high optical powers e.g. a beam of over 1 W. FIGS. 2-6 provide example architectures through which the optical power can be divided between multiple modulators and/or photo detectors so that none are overloaded.

When designing these systems, the required optical power to be transmitted through the optical link is determined based on what an acceptable signal to noise ratio is required at the output.

Using this information the required number of:
- lasers can be determined to provide the required optical power (wattage) based on the output power of the lasers and any other factors important to the system design, e.g. cost, laser efficiency, physical size etc;
- modulators can be determined based on their optical input power rating
- photodetectors (e.g. balanced photo detectors) can be determined based on their optical input power rating.

Using the determined number of modulators and photo detectors, the necessary number and placement of optical splitters is determined to divide the optical power between each of the modulators and/or photo detectors so that none have an optical power at their input that is greater than their optical input power rating.

Figure 1:
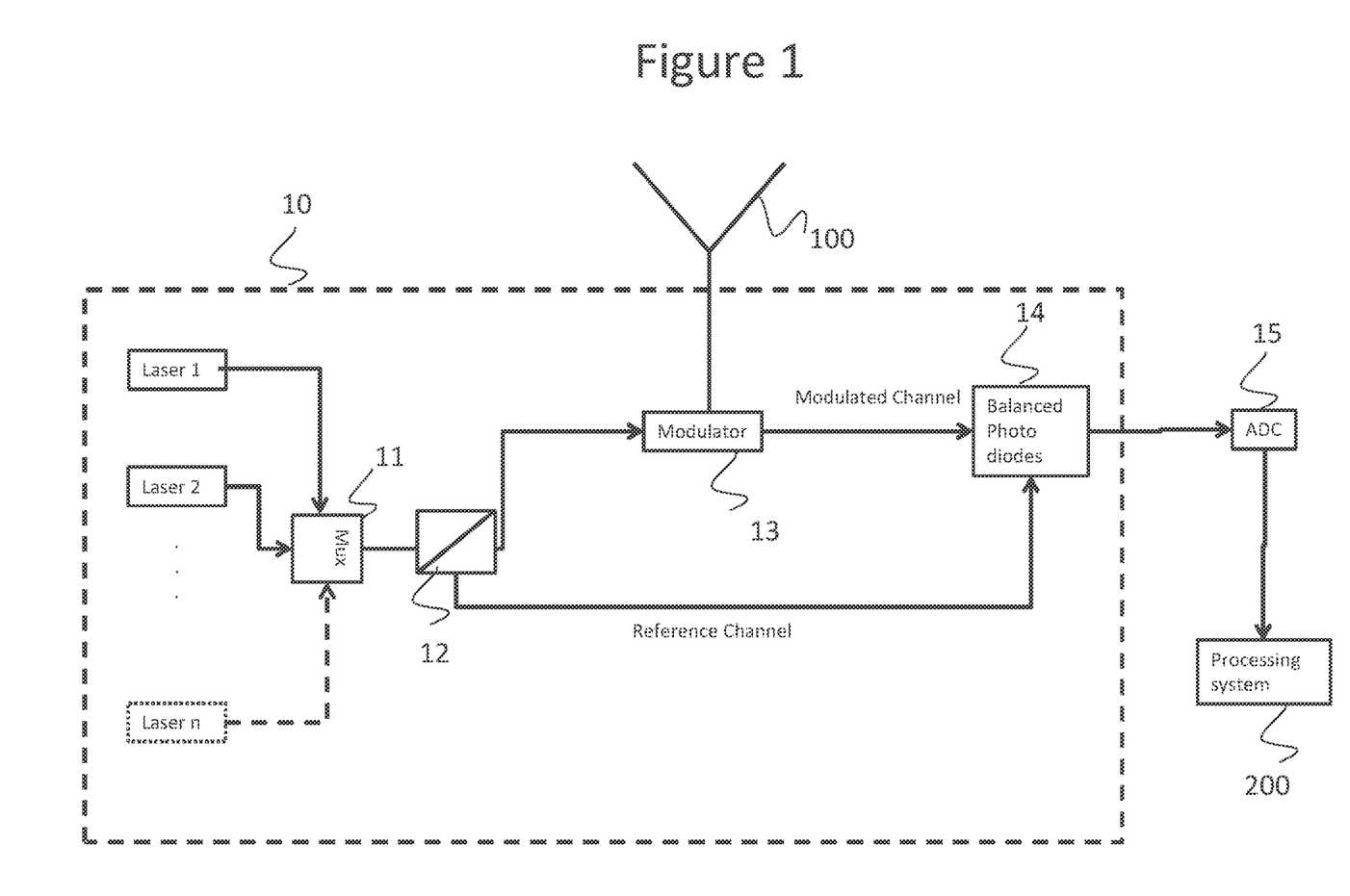
FIG. 1 is schematic of an optical link system arranged to carry a RF microwave signal.

With reference to FIG. 1 there is shown a radio link system incorporating an optical link system 10 for carrying a microwave RF signal received at an antenna 100 to a processing system 200. Example applications include use on airborne or marine platforms where the antenna 100 is usually separated from the processing system 200 by many metres, or mobile phone towers where the received RF signal needs to be carried down to the base of the tower where the receiving apparatus is usually housed.

The optical link system 10 comprises multiple lasers $L_1$ to $L_n$, preferably at least four lasers but could be many more, a wavelength division multiplexer (mux) 11, a splitter 12, electro-optical modulator 13, and balanced photodiode receiver 14. The analogue electrical output of the optical link system 10, provided by an electrical output of the balanced photodiode receiver 14, is optionally fed to an analogue to digital converter 15 in order to provide a digital input to the signal processing system 200.

Each of the lasers $L_1$ to $L_n$ are adapted to output a beam of a wavelength lying within the range 1530 nm to 1610 nm inclusive. The outputs of each laser $L_1$ to $L_n$ are multiplexed together using wavelength divisional multiplexing by multiplexer 11. The wavelength of the beam outputted by each laser $L_1$ to $L_n$ differs from the others by an amount to ensure beat frequencies arising from multiplexing the beams in the mux 11 are higher than the range detectable by the balanced photodiode receiver 14.

Commercially available 12-bit ADCs 15 are currently able to resolve up to 2 GHz. Where such a device is used, it is therefore preferred that the beat frequencies fall above 2 GHz. To achieve this a separation between each laser wavelength of at least 0.1 nm is preferred.

The multiplexed beam output of the mux 11 is carried along a single fibre to the splitter 12. The splitter 12 is a wavelength independent splitter, e.g. implemented by a fused fibre coupler which provides good power handling, that splits the multiplexed beam to provide two channels each carrying the multiplexed beam.

The first output of the splitter 12 provides an optical input to the modulator 13 which is arranged to impose the RF signal from the antenna 100, received through an electrical input of the modulator 13, by modulating the amplitude of the beam of the first channel. The modulator 13 may comprise a Mach-Zehner modulator.

The output of the modulator 13 is received at a first optical input of the balanced photodiode receiver 14. The second channel, which is unmodulated, acts as a reference channel, is received at a second optical input of the balanced photodiode receiver 14.

The balanced photodiode receiver 14, which is of conventional form, is arranged to carry out a common mode rejection function using the multiplexed optical signals received at its inputs to remove the relative intensity noise (RIN) of the lasers $L_1 \ldots L_n$, which will be present on both first and second channels, and outputs an electrical analogue signal equating to the RF signal imposed by the modulator 13 on the first channel.

As the balanced photodiode receiver 14 is unable to distinguish the different wavelengths of the multiplexed beams, all it detects is a modulated optical beam with an optical intensity that is substantially half of the combined optical intensity of the lasers at each input.

In one arrangement the first and second channels are carried by separate fibres. Nevertheless, it may be possible to carry the two channels along a single fibre by utilising the Mach-Zender modulator's characteristic that the degree of modulation imposed varies with the angle of polarisation of the beam. Thus one polarisation channel will be unmodulated but have essentially the same fibre delay to act as a reference for common mode rejection. To make use of this effect the polarisation of one or both channels is altered so as to differ from one another. The polarisation of the first channel is selected so that it will be modulated by the modulator 13 to carry the RF signal, whereas the polarisation of the second channel is selected so that it passes through the modulator 13 without being modulated.

It is favourable that the optical power of the first and second channels at the first and second optical inputs is substantially the same, i.e. substantially half the total combined optical intensity of the lasers. Because some optical power in the first channel is lost in the modulator 13, the splitter 12 may be arranged to asymmetrically split the multiplexed beam as to make the optical power of the first channel at the output of the splitter 11 greater than the second channel to compensate for loses in the modulator 13.

Figure 2:
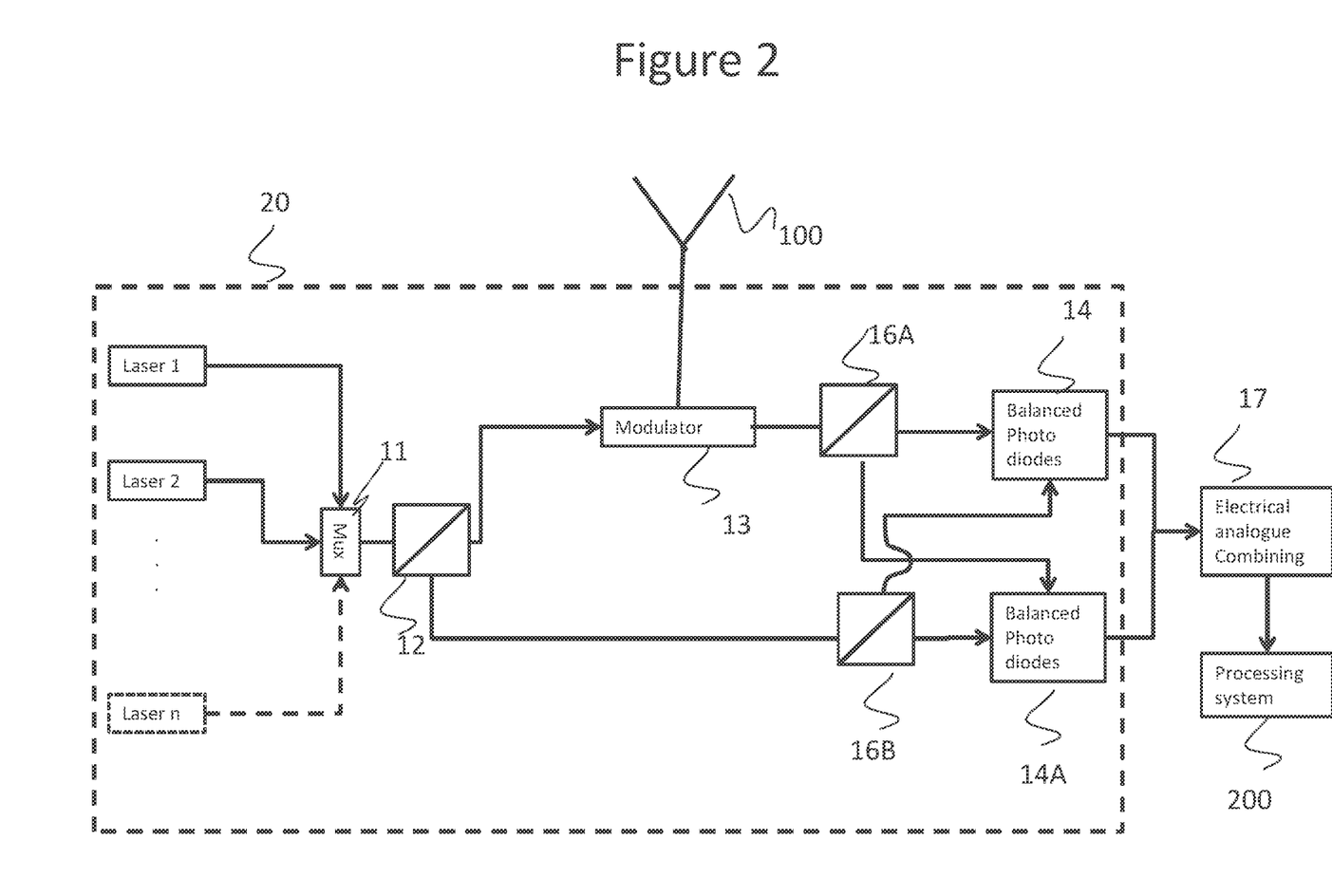
FIG. 2 is a schematic of a variant optical link system arranged to carry a RF microwave signal.

FIG. 2 illustrates a variant embodiment 20 which includes two further wavelength independent splitters 16A 16B and a further balanced photodiode receiver 14A.

The first of the further splitters 16A splits the modulated first channel, i.e. after output from modulator 13, and the second further splitter 16B splits the second channel so as to provide two modulated first channels and two unmodulated reference channels.

The electrical outputs of the two photodiode receivers 14, 14A are combined by an electrical analogue combiner 17, e.g. implemented by a Wilkinson coupler (although other suitable RF combining circuits will be known to those skilled in the art), to provide an analogue electrical input to the processing system 200. As the RF signal is present at outputs of both photodiode receivers, combining their outputs increases the signal strength provided to the processing system 200.

The arrangement of FIG. 2 provides means of reducing the optical intensity at each photodiode. This allows the optical power of the first and second channels to be greater than the maximum operational capability of photodiode. Note that modulators are typically able to handle much greater optical power than a photodiode.

The concept of splitting the first and second channels can be taken further. For example additional splitters may be used to split each of the first and second channels four or more ways with additional balanced photodiode receivers used to receive each of the split channels.

Figure 3:
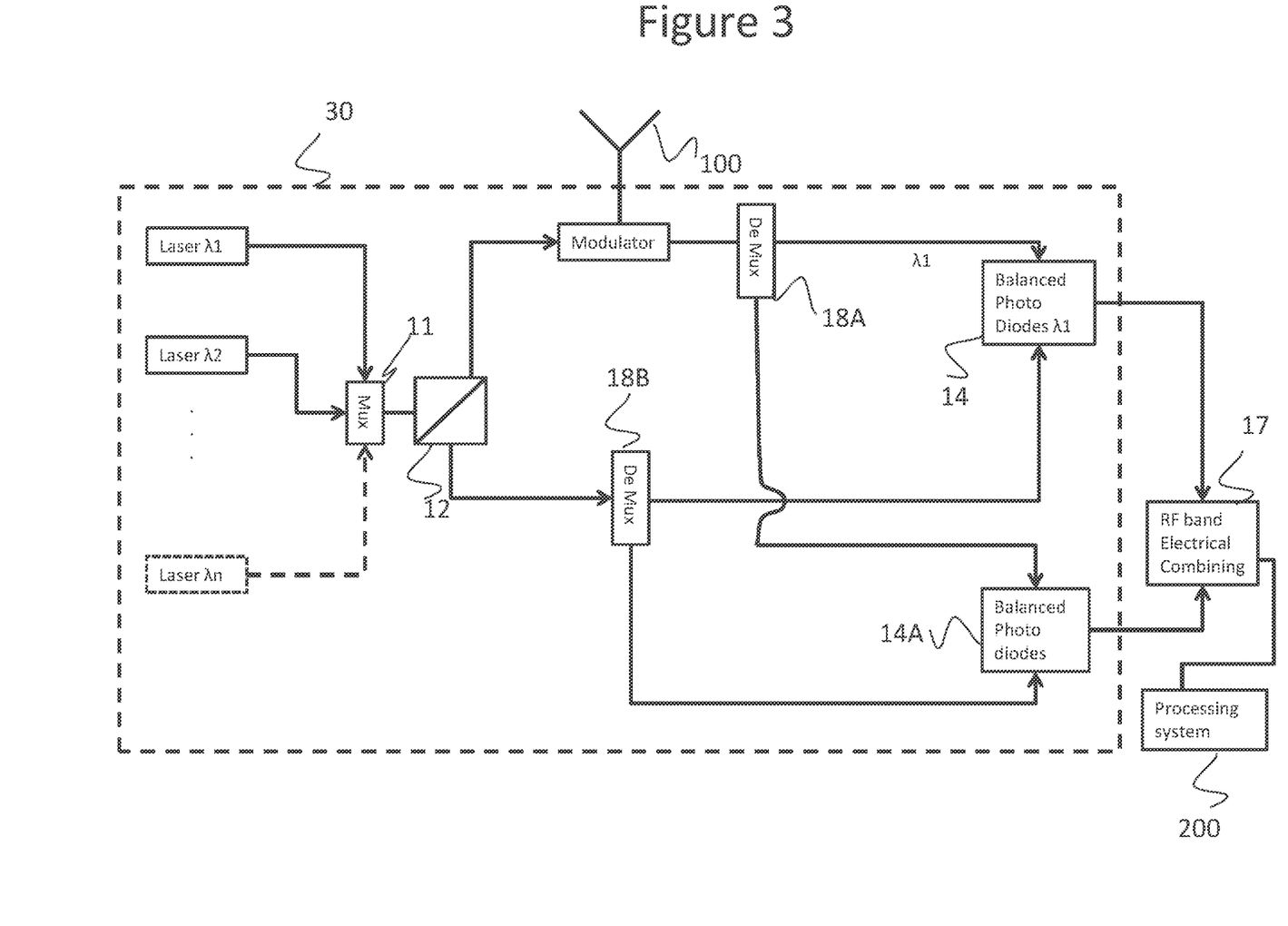
FIG. 3 is a schematic of a third variant optical link system arranged to carry a RF microwave signal.

FIG. 3 illustrates another variant embodiment of optical link 30 that differs from FIG. 2 in that instead of using wavelength independent splitters 16A 16B, the system 30 comprises a first demultiplexer (demux) 18A and a second demux 18B to split the first and second channels. The first demux splits the modulated first channel to provide two outputs each comprised from one or more of the multiplexed wavelengths. Where the system comprises only two lasers with wavelengths $\lambda_1$, $\lambda_2$ respectively, one output will comprise $\lambda_1$ and the other output $\lambda_2$. Where the system comprises more than two lasers, at least one, if not both, outputs will be comprised from multiple multiplexed wavelengths, with each wavelength only found in one of the outputs. The advantage of using a demux over a wavelength independent splitter is improved control of the optical power splitting as wavelengths can be separated accurately. Each of the lasers may output beams having substantially the same optical power in which case the beam may be unsymmetrical split by ensuring one of the split beams was comprised from more constituent wavelengths than the other. Alternatively the leaser may output beams of different optical powers which would allow the power within split beams to differ in optical power whilst each comprised from the same number of wavelengths.

Additional demuxes may be used if it's desired to split the first and second channels by more than two.

Figure 4:
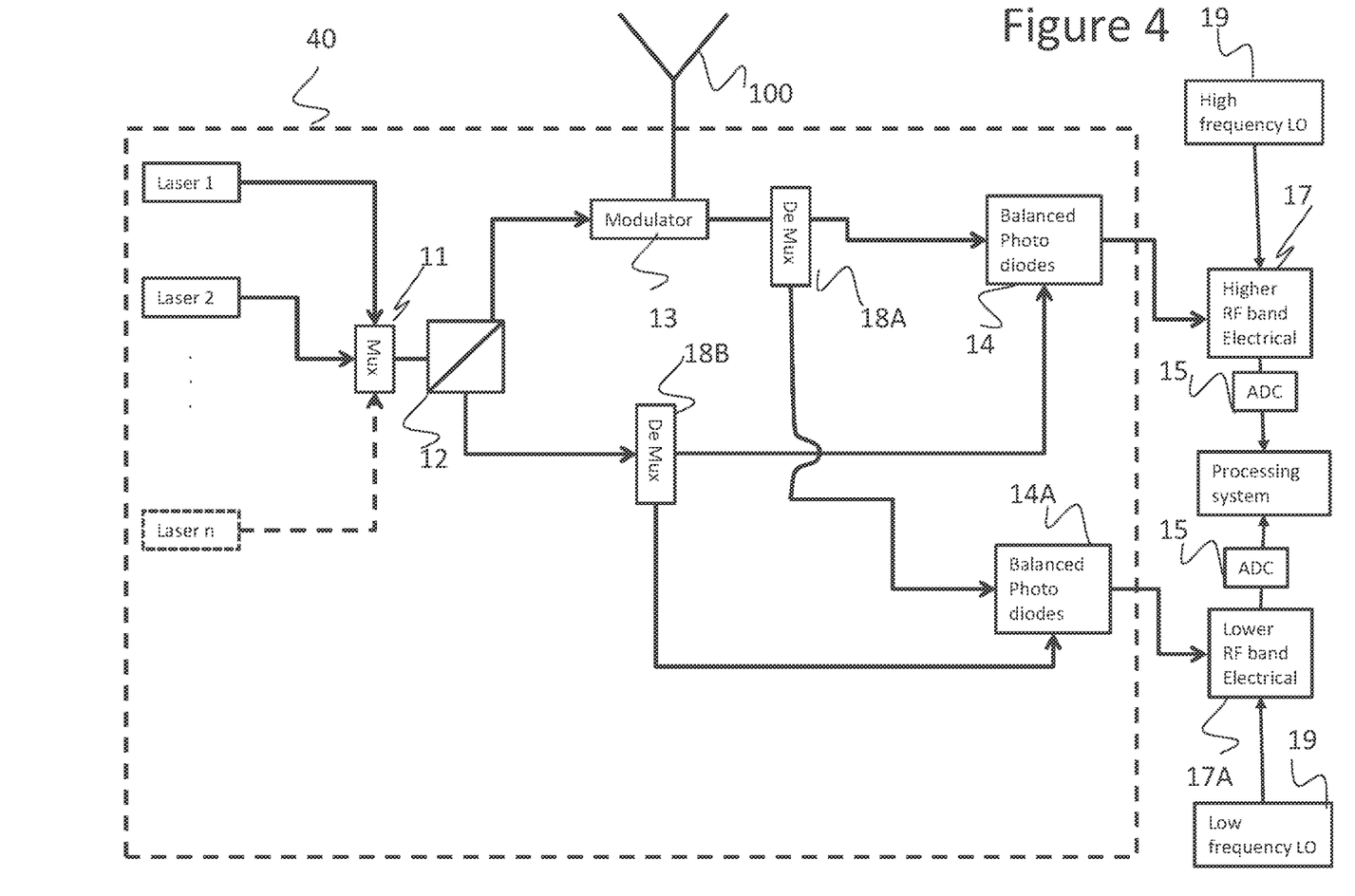
FIG. 4 is a schematic of a fourth variant optical link system arranged to carry a RF microwave signal.

FIG. 4 illustrates a further variant embodiment similar to that of FIG. 3 except that instead of comprising a single electrical RF combiner 17 which combines the electrical outputs of both balanced photodiodes 14A 14B, the system comprises two electrical combiners 17A 17B that function as RF mixers to down-convert the RF signal.

A first of the electrical combiners 17A is arranged to receive the electrical output of one of the balanced photodiodes and mixes it with an RF LO signal from a first local oscillator 19A.

A second of the electrical combiners 17B is arranged to receive the electrical output of the other balanced photodiode and an RF LO signal from a second local oscillator 19B.

The frequency of output from the RF LO signals are selected in order to up-convert or down-convert the RF signal received through the antenna 100, e.g. so that can be processed by an ADC 15. The use of parallel RF mixers imposing LO RF signals of different frequencies allows a wide band (i.e. multiple times wider than the range that can be analysed by a single ACD) RF signal received at the antenna to be processed.

Figure 5:
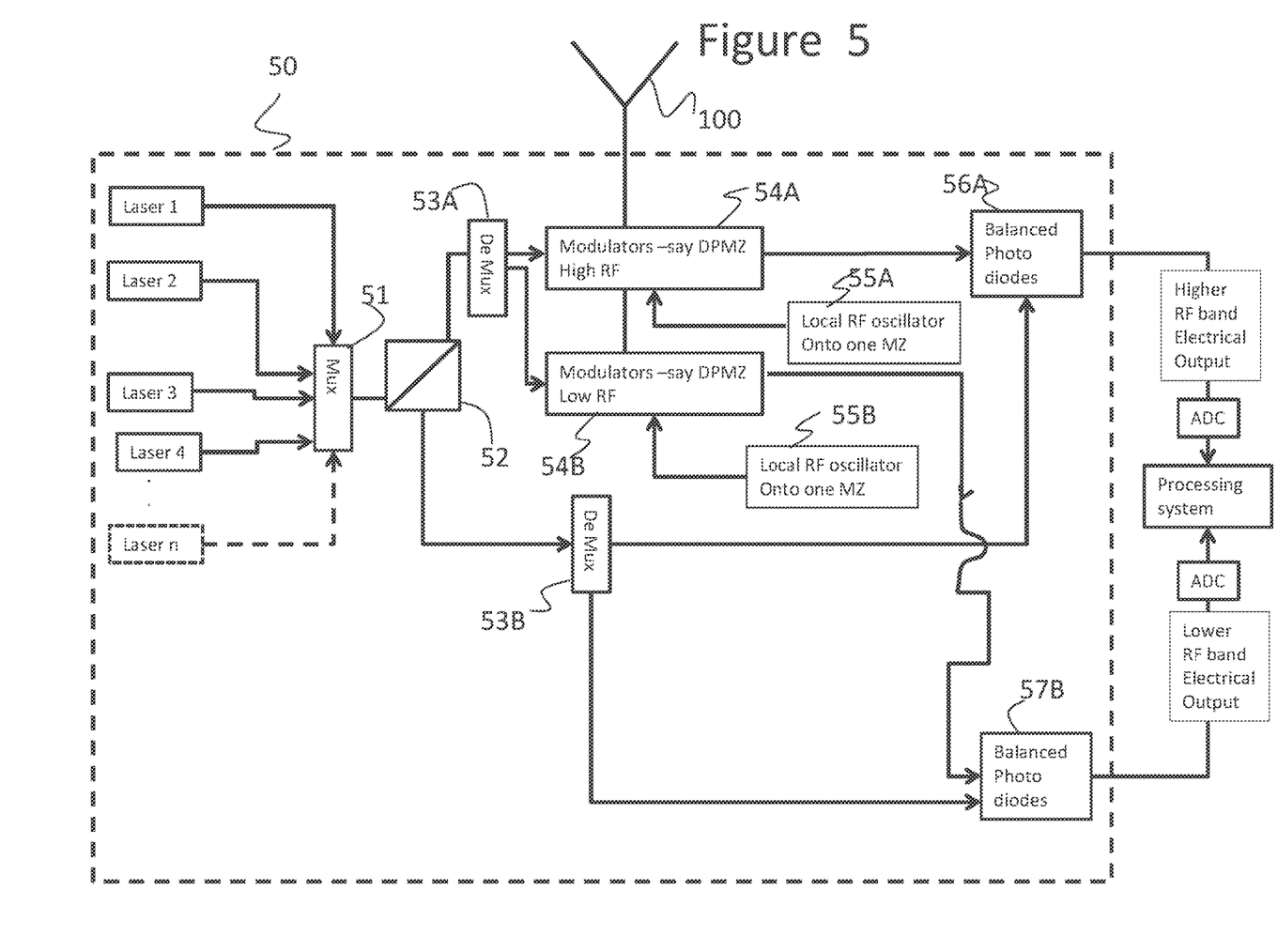
FIG. 5 is a schematic of a fifth variant optical link system arranged to carry a RF microwave signal.

In a variant, mixing of the RF with a LO signal may be done in the optical domain. The modulator 13 may be adapted to impose both a received RF signal and an internally derived RF signal from a local oscillator such as described in WO2006/102678. An arrangement that implements this is shown in FIG. 5.

The link 50 comprises multiple lasers $L_1$ to $L_n$. The outputs of the lasers $L_1$ to $L_n$, are multipexed and split in order to form two pairs of channels, four channels in total. Each pair of channels comprises the same combination of multiplexed wavelengths.

Creation of these four channels may be achieved in a various different ways. In the way implemented in the example of FIG. 5 the outputs of the lasers $L_1$ to $L_n$ are mulitplexed by wavelength division multiplexer (mux) 51, and the multiplex beam split into two by wavelength independent splitter 52. Demultiplexers 53A, 53B, split each of the two outputs from the splitter 52 into two so as to provide the four channels. The output of each demulitplexer 53A 53B provides one channel of each pair.

Another means of obtaining the same result would be to use two multiplexers 51 that each multiplex different laser outputs and a wavelength independent splitters to split each of the two channels outputted from the multiplexers. Various other arrangements are possible.

The channels outputted from the first demux 53A are modulated by respective first and second modulators 54A 54B to impose the RF signal thereon from the antenna 100. Additionally, each modulator 54A 54B also imposes an RF signal output from a different local oscillator. The frequency of the RF signals from the respective LOs are different. In order to impose two separate RF signals onto each channel, each of the modulators 54A 54B may comprise a dual-parallel Mach-Zehnder modulator.

The outputs from the two modulator 54A 54B are received at first inputs of separate balanced photodiodes, with the channels outputted from the second demux 53B received at the second inputs of said balanced photodiodes. In this way each balanced photodiode receiver will receive the same combination of optical wavelengths at its two inputs, i.e. light derived from the same combination of lasers of the plurality of lasers. This ensures that the RIN associated with these lasers will cancel at the balanced photodiode receiver.

With lasers currently available to the applicant, RIN is significant enough to warrant the use of balanced photodiodes for its removal. However, for applications where low RIN is less important, or if lasers are developed in future with significantly reduced RIN, balanced photodiode detectors may be dispensed with.

Figure 6:
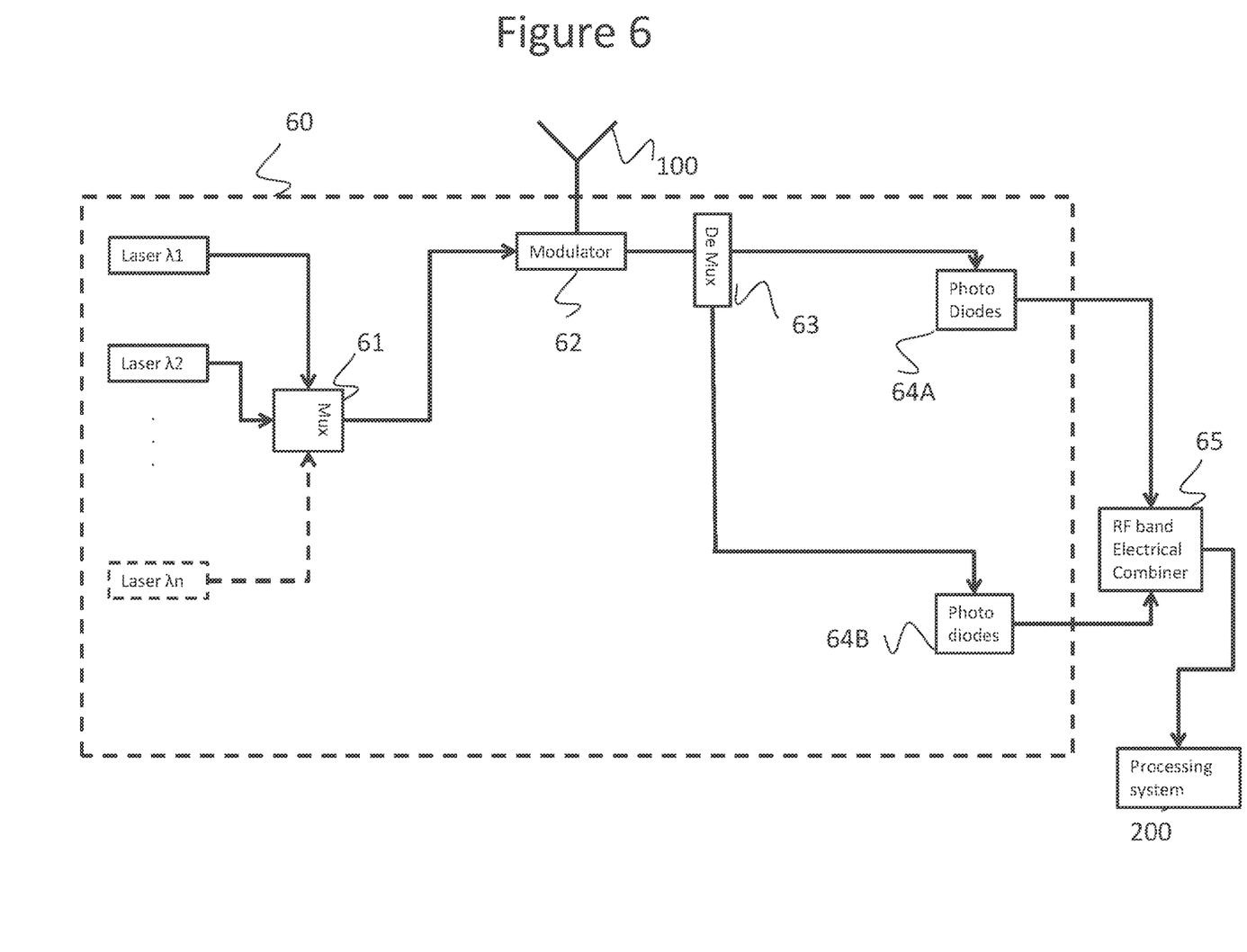
FIG. 6 is a schematic of a sixth variant optical link system arranged to carry a RF microwave signal.

FIG. 6 illustrates a further example of a link that may be used in such instances. The link comprises multiple lasers $L_1$ to $L_n$, a wavelength division multiplexer (mux) 61, electro-optical modulator 62, a demux 63 and multiple photodiode receivers 64A, 64B.

The outputs from the multiple lasers are multiplexed by mux 61 to provide a multiplex beam. The modulator 62 modulates the multiplexed beam. The demux 63 splits the modulated multiplex beam into two or more (in this case two) modulated beams each of the split beams is received by a photodiode. The RF signal is outputted at the electrical outputs of each photodiode and combined by an analogue RF combiner 65.

Although the examples are described in relation to carrying of an RF signal from an antenna to a signal processing system, the link may be adapted to carry RF signals in the other direction. Where so the mixers of FIGS. 5 and 6 may be used to up-convert the RF signal from the processing signal for broadcast by the antenna.

It is possible that the system may be used for purposed other than as a radio link to carry a RF signal between two locations. For example, the system may be used as a circuit fragment of a radio circuit used to process a RF signal, e.g. up-convert or down convert.

The invention claimed is:

1. A system including an optical link for carrying a microwave radio frequency (RF) signal, the optical link system comprising:
   a plurality of laser light sources for producing a plurality of different wavelengths of light;
   a multiplexer configured to multiplex the plurality of wavelengths of light to provide a multiplexed optical beam;
   a modulator configured to modulate the multiplexed optical beam to impose the microwave RF signal onto the multiplexed optical beam; and
   a photodiode receiver having an optical input and an electrical output, the photodiode receiver configured and arranged to receive at least a portion of the modulated multiplexed optical beam and to output the microwave RF signal at its electrical output, wherein the system is configured such that:
   optical power of at least the portion of the modulated multiplexed optical beam received at the optical input being equal to a combined optical power of the plurality of different wavelengths of light included in the received modulated multiplexed optical beam; and
   each different wavelength of light is separated from the other wavelengths of light by a wavelength separation sufficient that beating between the plurality of different wavelengths of light arising within the multiplexed optical beam occurs at frequencies which are greater than can be resolved by the photodiode receiver.

2. A system according to claim 1, wherein the plurality of laser light sources for producing the plurality of wavelengths of light, each produce a different wavelength within a range 1530 nm to 1610 nm inclusive.

3. A system according to claim 1, comprising:
   a post modulation splitter arranged to split the modulated multiplexed optical beam into multiple modulated beams; and
   the optical link includes multiple photodiode receivers, each of the multiple photodiode receivers being configured and arranged to receive a different one of the multiple modulated beams.

4. A system according to claim 3, comprising:
   an RF combiner configured and arranged to combine the electrical outputs from the multiple photodiode receivers.

5. A system according to claim 3, comprising:
   multiple RF mixers and multiple local oscillators, each of the multiple local oscillators being configured and arranged to provide a LO signal of a different RF frequency; and
   each RF mixer being configured and arranged to receive and mix the electrical output from a different one of the multiple photodiode receivers and the LO signal from a different one of the multiple local oscillators so as to down convert or up convert the RF microwave signal.

6. A system according to claim 3, wherein the post modulation splitter comprises a demultiplexer.

7. A system according to claim 1, comprising:
   a wavelength independent splitter arranged to split the multiplexed optical beam into first and second multiplexed optical channels;
   the modulator being configured and arranged to modulate the first multiplexed optical channel to impose the microwave radio frequency signal onto the first multiplexed optical channel; and
   the photodiode receiver including a balanced photodiode receiver having:
   a first optical input configured and arranged to receive the modulated first multiplexed optical channel; and
   a second optical input configured and arranged to receive the second multiplexed optical channel;
   the balanced photodiode receiver being configured and arranged to carry out a common mode rejection function on the first and second optical inputs to remove relative intensity noise RIN.

8. A system according to claim 1, wherein the modulator is configured and arranged to impose a first LO RF signal from a local oscillator onto the multiplexed optical beam for upconverting or downconverting the microwave RF signal.

9. A system according to claim 8, comprising:
   means including the multiplexer to provide a further multiplexed optical beam from the plurality of wavelengths of light;
   a further modulator to modulate the further multiplexed optical beam to impose the microwave radio frequency signal onto the further multiplexed optical beam; and
   wherein the further modulator is configured and arranged to also impose a second LO RF signal onto the further multiplexed optical beam, the first and second LO RF signals being of different frequencies; and
   the system including a further photodiode receiver configured and arranged to receive the modulated further multiplexed optical beam.

10. A system according to claim 1, configured and arranged in combination with an antenna, to carry RF signals between the antenna mounted on an airborne or marine platform to a processing system also mounted on said airborne or marine platform.

11. A system according to claim 2, comprising:
   a post modulation splitter arranged to split the modulated multiplexed optical beam into multiple beams; and
   the multiple photodiode receivers, each being configured and arranged to receive one of the multiple beams.

12. A system according to claim 1, comprising:
   a wavelength independent splitter arranged to split the multiplexed optical signal into first and second multiplexed optical channels;
   the modulator being configured and arranged to modulate the first multiplexed optical channel to impose the microwave radio frequency signal onto the first multiplexed optical channel; and
   the photodiode receiver including a balanced photodiode receiver having:
   a first optical input configured and arranged to receive the modulated first multiplexed optical channel; and
   a second optical input configured and arranged to receive the second multiplexed optical channel;
   the balanced photodiode receiver being configured and arranged to carry out a common mode rejection function on the first and second optical inputs to remove relative intensity noise RIN.

13. A system according to claim 3, comprising:
a wavelength independent splitter arranged to split the multiplexed optical beam into first and second multiplexed optical channels;
the modulator being configured and arranged to modulate the first multiplexed optical channel to impose the microwave radio frequency signal onto the first multiplexed optical channel; and
the photodiode receiver including a balanced photodiode receiver having:
a first optical input configured and arranged to receive the modulated first multiplexed optical channel; and
a second optical input configured and arranged to receive the second multiplexed optical channel;
the balanced photodiode receiver being configured and arranged to carry out a common mode rejection function on the first and second optical inputs to remove relative intensity noise RIN.

14. A system according to claim 13, wherein:
the optical link including a further optical splitter configured and arranged to split the second multiplexed optical channel into multiple beams, and the multiple photodiode receivers include multiple balanced photodiode receivers; and
each multiple balanced photodiode receiver being configured and arranged to receive at a first optical input, a different one of the modulated multiple beams, and at a second optical input, a different one of the multiple beams.

15. A system according to claim 14, wherein the further optical splitter comprises:
a demultiplexer.

16. A method for conveying a microwave radio frequency (RF) signal via an optical link, the method comprising:
multiplexing a plurality of wavelengths of light from a plurality of lasers to provide a multiplexed optical beam;
modulating the multiplexed optical beam to impose the microwave RF signal onto the multiplexed optical beam; and
using a photodiode receiver, having an optical input and an electrical output, to receive at least a portion of the modulated multiplexed optical beam and to output the microwave RF signal at its electrical output,
wherein the optical power of at least the portion of the modulated multiplexed optical beam received at the optical input being equal to a combined optical power of the plurality of wavelengths of light included in the received modulated multiplexed optical beam; and
wherein each different wavelength of light is separated from other wavelengths of light by a wavelength separation sufficient that beating between the plurality of different wavelengths of light arising within the multiplexed optical beam occurs at frequencies which are greater than can be resolved by the photodiode.

17. A method of designing and constructing a system including an optical link for carrying a microwave radio frequency (RF) signal to increase signal to noise ratio in which shot noise is a dominant source of noise, the method comprising:
identifying a requisite optical power to be transmitted through the optical link to provide, by virtue of a signal to shot noise ratio, a specified noise floor level at an output of the system;
determining a number of lasers for the optical link based on each laser's optical output power to provide an identified optical power for the optical link;
determining a number of modulators for the optical link to modulate the RF signal onto one or more output beams(s) of the lasers, based on each modulator's maximum optical input level;
determining a number of photodiode receivers for the optical link to receive and convert one or more optical beam(s) modulated to carry the RF signal to an electrical signal, the number of photodiode receivers determined based on each photodiode receiver's maximum optical input level; and
constructing the optical link with the determined number of lasers, modulators and photodiode receivers, wherein the number of modulators and/or photodiode receivers is greater than one.

* * * * *